(12) United States Patent
Lunardini et al.

(10) Patent No.: US 12,529,716 B2
(45) Date of Patent: Jan. 20, 2026

(54) RE-CONFIGURABLE SENSOR DEVICE AND METHOD FOR RECONFIGURING A SENSOR DEVICE USING A PULSE MODULATED SIGNAL

(71) Applicant: Infineon Technologies AG, Neubiberg (DE)

(72) Inventors: Diego Lunardini, Finkenstein am Faaker See (AT); Edwin Mario Motz, Wernberg (AT); Nagasrinivasa Rao Kureti, Villach (AT)

(73) Assignee: Infineon Technologies AG, Neubiberg (DE)

( * ) Notice: Subject to any disclaimer, the term of this patent is extended or adjusted under 35 U.S.C. 154(b) by 154 days.

(21) Appl. No.: 18/456,179

(22) Filed: Aug. 25, 2023

(65) Prior Publication Data

US 2024/0069077 A1 Feb. 29, 2024

(30) Foreign Application Priority Data

Aug. 30, 2022 (DE) .......................... 102022209001.2

(51) Int. Cl.
| | | |
|---|---|---|
| G01R 19/165 | (2006.01) |
| B60G 13/14 | (2006.01) |
| B60K 6/26 | (2007.10) |
| G01R 19/00 | (2006.01) |
| G01R 35/00 | (2006.01) |

(52) U.S. Cl.
CPC ....... *G01R 19/16528* (2013.01); *B60G 13/14* (2013.01); *B60K 6/26* (2013.01); *G01R 19/0092* (2013.01); *B60G 2204/4192* (2013.01); *B60G 2300/50* (2013.01); *G01R 35/005* (2013.01)

(58) Field of Classification Search
CPC ............ G01R 19/16528; G01R 35/005; G01R 19/0092; G01D 21/00; B60G 13/14; B60G 2204/4192; B60G 2300/50; B60K 6/26
USPC .......................................................... 324/157
See application file for complete search history.

(56) References Cited

U.S. PATENT DOCUMENTS

| | | | |
|---|---|---|---|
| 2008/0115564 A1* | 5/2008 | Buchberger | G01D 1/18 330/69 |
| 2010/0141153 A1 | 6/2010 | Recker et al. | |
| 2011/0133723 A1* | 6/2011 | Forsyth | G01D 5/145 324/207.2 |
| 2018/0063661 A1 | 3/2018 | Hartwell | |
| 2020/0241085 A1* | 7/2020 | Peev | G01D 3/08 |

(Continued)

FOREIGN PATENT DOCUMENTS

| | | |
|---|---|---|
| DE | 202007003208 U1 | 7/2007 |
| WO | 9834206 A1 | 8/1998 |

(Continued)

*Primary Examiner* — Raul J Rios Russo
(74) *Attorney, Agent, or Firm* — Harrity & Harrity, LLP

(57) ABSTRACT

Disclosed is a re-configurable sensor arrangement (100) including a sensor device (110) and a controller device (120), both being configured to communicate with each other, wherein the controller device (120) is configured to transmit a pulse modulated signal (130) to the sensor device (110) via a one-wire voltage interface (140), and wherein the sensor device (110) is configured to receive the pulse modulated signal (130) via the one-wire voltage interface (140) and to re-configure its internal configuration in response to the received pulse modulated signal (130).

20 Claims, 4 Drawing Sheets

(56) References Cited

U.S. PATENT DOCUMENTS

2022/0271769 A1* 8/2022 Huynh .................. H02J 50/001
2022/0404182 A1* 12/2022 Latham ................. G01D 18/00
2023/0344256 A1* 10/2023 Price .................. G01N 33/0009

FOREIGN PATENT DOCUMENTS

WO      2020025760 A1    2/2020
WO      2021056839 A1    4/2021

* cited by examiner

RE-CONFIGURABLE SENSOR DEVICE AND METHOD FOR RECONFIGURING A SENSOR DEVICE USING A PULSE MODULATED SIGNAL

CROSS REFERENCE TO RELATED APPLICATION

This application claims priority to German Patent Application No. 102022209001.2 filed on Aug. 30, 2022, the content of which is incorporated by reference herein in its entirety.

FIELD

Implementations of the present disclosure relate to a re-configurable sensor device, wherein the internal sensor configuration of the sensor device may be changed based on a received pulse modulated signal. Further implementations relate to a method for re-configuring a sensor device using a pulse modulated signal.

BACKGROUND

Nowadays, sensors are widely used for different fields of applications. Sensors are getting more and more versatile. Thus, it is desirable to provide a quick and easy option for re-configuring a sensor to react to different conditions.

In particular, sensors with a linear output need a flexible programming option for analog or functional parameters. Analog parameters may be, for instance for a magnetic current sensor, a gain as a calibration opportunity in system calibration, a quiescent voltage, a range (e.g., 10 mT, 50 mT, 200 mT or 10 A, 50 A, 200 A or pressure ranges or any other sensor parameters), a bandwidth (e.g., 30 kHz or 200 kHz sensor bandwidth), an Over-Current Detection level (OCD). Functional parameters may be, for instance, an output polarity, an output quiescent voltage (e.g. 10% of VDD, 50% of VDD or 75% of VDD), a duty-cycle for low-power operation, a test mode, a request of internal measurements, like temperature and stress, or a request of functional safety status signals.

In currently available sensors, it is possible to re-configure the sensor, e.g., to set one of these analog or functional parameters, using hardwired pin-programing. That means, one or more dedicated hardwired pins are provided at the sensor that can be programmed to certain values in order to set the respective parameter. For example, some sensors may provide a hardwired pin-programming option for the gain, wherein two dedicated pins (each with 'high' and 'low') are available that can be switched into four different positions. Thus, four different gains can be adjusted. If more than four settings are desired, then a respective number of additional pins has to be provided. However, this reduces space for other useful pins and, as a consequence, this reduces the possibility for miniaturizing the sensor.

A further currently available option for setting analog or functional parameters for re-configuring a sensor is realized using additional dedicated hardware components. For instance, thresholds such as different voltage or current detection levels may be set using voltage dividers. The voltage dividers are commonly built-up with two resistors connected in series with the input voltage applied across the resistor pair and the output voltage picked at a connection node between those two resistors. However, expensive high precision hardware (e.g., resistors) is needed.

Thus, it is an object of the herein described innovative concept to provide a sensor that is capable of providing a plurality of different settings for re-configuring the sensor without the above mentioned drawbacks.

This goal is achieved using the herein disclosed re-configurable sensor arrangement according to the independent claims. Further implementations and advantageous aspects are suggested in the dependent claims.

SUMMARY

In this disclosure, a re-configurable sensor arrangement is suggested that may include a sensor device and a controller device, both being configured to communicate with each other. The controller device may be configured to transmit a pulse modulated signal to the sensor device via a one-wire voltage interface. The sensor device may be configured to receive the pulse modulated signal via the one-wire voltage interface and to re-configure its internal configuration in response to the received pulse modulated signal.

Furthermore, a respective method for configuring a sensor using a pulse modulated signal is suggested. The method includes a step of providing a sensor device and a controller device, both configured to communicate with each other. The method further includes a step of transmitting a pulse modulated signal from the controller device to the sensor device via a one-wire voltage interface. The method further includes a step of receiving, by the sensor device, the pulse modulated signal via the one-wire voltage interface and re-configuring the sensor device in response to the received pulse modulated signal.

Further, a computer program is suggested configured to implement the above-described method when being executed on a computer or signal processor, so that the above-described method is implemented by one of the computer programs.

BRIEF DESCRIPTION OF THE DRAWINGS

In the following, implementations of the present disclosure are described in more detail with reference to the figures, in which.

DETAILED DESCRIPTION

Figure 1:
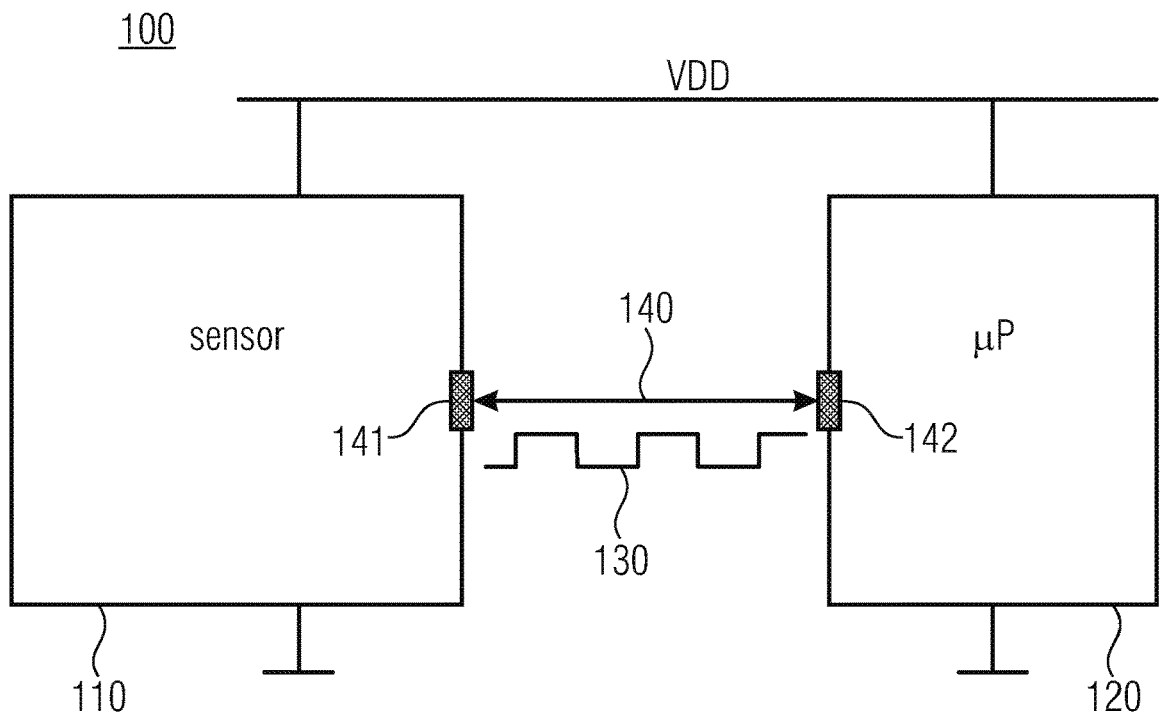
FIG. 1 shows a schematic block diagram of a sensor arrangement according to an implementation.

Equal or equivalent elements or elements with equal or equivalent functionality are denoted in the following description by equal or equivalent reference numerals.

Method steps which are depicted using a block diagram and which are described with reference to the block diagram may also be executed in an order different from the depicted and/or described order. Furthermore, method steps concerning a particular feature of a device may be replaceable with the feature of the device, and the other way around.

FIG. 1 shows an implementation of the herein described innovative re-configurable sensor arrangement 100. The re-configurable sensor arrangement 100 may comprise a sensor device 110 and a controller device 120, both being configured to communicate with each other. The controller device 120 may be configured to transmit a pulse modulated signal 130 to the sensor device 110 via a one-wire voltage interface 140. For example, the sensor device 110 may comprise a pin 141 at which the one wire voltage interface 140 is provided—Additionally or alternatively, the controller device 120 may comprise a pin 142 at which the one-wire voltage interface 140 is provided. The sensor device 110 may be configured to receive the pulse modulated signal 130 via the one-wire voltage interface 140 and to re-configure its internal configuration in response to the received pulse modulated signal 130.

The one-wire voltage interface 140 may be characterized by at least two distinct features. First, the one-wire voltage interface 140 may comprise only one single wire. Second, the pulse modulated signal 130 transmitted via the one-wire voltage interface 140 may be a voltage signal, and in particular a standard supply voltage signal. For example, oftentimes standard supply voltages of 3.3 V or 5 V are used in electronics. In such non-limiting cases, the pulse modulated signal 130 may be a 3.3 V or a 5 V standard supply voltage signal, respectively. Accordingly, modulation of the voltage signal 130 may be performed between a low level, e.g., 0 V, and a high level, e.g., 3.3 V or 5 V, respectively.

This is different to LIN-protocols (LIN: Local Interconnect Network) or SENT-protocols (SENT: Single Edge Nibble Transmission), in which significantly higher voltage signals, e.g., between 7 V (low) and 18 V (high) are used.

Furthermore, the one-wire voltage interface 140 according to the present concept may be a bidirectional interface for transmitting and receiving one or more pulse modulated signals 130 via one and the same wire of the single-wire voltage interface 140. For instance, not only may the controller device 120 send a pulse modulated signal 130 to the sensor device 120, but the sensor device 110 may also send a pulse modulated signal 130 to the controller device 120 via the one-wire voltage interface 140. Also in this example, the transmitted pulse modulated signal 130 may be a voltage signal, and in particular a standard supply voltage signal, as mentioned before. This is further distinct from LIN-protocols or SENT-protocols, in which the sensor device 110 transmits an electric current modulated signal (7 mA/14 mA) to the controller device 120.

Accordingly, a simple 3.3 V or 5 V standard voltage supply signal 130 may be used in the present concept, which is much more power-efficient, and which has a much smaller area consumption as conventional 7 V/18 V and 7 mA/14 mA-Interfaces.

According to the herein described innovative concept, the pulse modulated signal 130 may be at least one of a Pulse Width Modulated (PWM) signal and a Pulse Code Modulated (PCM) signal. In case of a PCM signal, the one-wire voltage interface 140 may be configured as a bidirectional DCDI (DCDI: Digital Control and Diagnosis Interface). A DCDI may be a single-master, multi-slave UART based interface. It provides for a bus compatible fast bidirectional one-wire DCDI communication on dedicated pin 'DCDI' operating as input/output. The 'DCDI' pin may operate as open-drain.

The PCM-Interface (e.g., DCDI) may be provided additionally or alternatively to the PWM-Interface. In other words, the one-wire voltage interface 140 may be configured as a PWM-Interface, a PCM-Interface or a PWM- and PCM-Interface in parallel. Accordingly, the pulse modulated signal 130 transmitted via the one-wire voltage interface 140 may be at least one of a PWM-signal and a PCM-signal.

Summarizing, the one-wire voltage interface 140 may be configured as a bidirectional single-wire interface that provides for a bidirectional communication between the sensor device 110 and the control device 120 via one single wire, e.g., via one single pin (e.g., one single pin at the sensor device 110 and one single pin at the controller device 120). This distinguishes the present innovation from two-Pin electric current modulated sensors using two pins for bidirectional communication.

Furthermore, the pulse modulated signal 130 transmitted via the one-wire voltage interface 140 may be a modulated voltage signal, and in particular a modulated standard supply voltage signal. This distinguishes the present innovative concept from existing interfaces using electric current modulations, such as LIN-protocols, SENT-protocols, or the like.

According to the present innovative concept, the sensor device 110 may be configured to re-configure its internal configuration in response to the received pulse modulated signal 130. The term "re-configuring" may mean everything that may change a current configuration of the sensor device 110. In other words, the sensor device 110 may switch from a first internal sensor configuration to a different second internal sensor configuration. In yet other words, internal settings of the sensor device 110 may be changed. For example, the sensor device 110 may be re-configured in order to perform a certain action (e.g., an over current detection—OCD), or to set a certain value (e.g., an OCD threshold value), or to provide a status report (e.g., via bi-directional communication), or to switch from a receiving mode into a transmission mode, or vice versa, (e.g., in case of bi-directional communication), etc. In other words, the pulse modulated signal 130 from the controller device 120 may change the analog output behavior of the analog output of the sensor device 110 (e.g., sensitivity, offset, bandwidth, etc.). Some examples will be described in detail further below.

Stated in general terms, the sensor device 110 may be configured to re-configure its internal configuration
- for executing a predetermined function (e.g., an over current detection—OCD) in response to the received pulse modulated signal 130, and/or
- for setting a predetermined parameter (e.g., an OCD threshold value) in response to the received pulse modulated signal 130.

In some cases, a predetermined function may be the same as a digital/functional setting. There may be several different options for predetermined functions. Just to mention a few, the predetermined function may be at least one of:
- setting an output polarity,
- switching between predetermined gain settings,
- setting a ratiometric behavior instead of a fixed gain,
- switching between different power modes (e.g., switching into a low-power mode),
- setting a duty cycle for low-power operation,
- switching between predetermined quiescent output voltage settings,
- setting a quiescent output voltage ratio (e.g., 10% of VDD, 50% of VDD or 75% of VDD),
- setting a chopper frequency,
- performing a bandwidth selection,
- performing a test mode,
- providing, on request of the controller device 120, a result of an internal measurement (e.g., temperature, stress, etc.),
providing, on request of the controller device 120, a functional safety status signal (e.g., a status bit).

Furthermore, a lot of different possible predetermined analog or functional parameter values may be set in response to the received pulse modulated signal 130. Some non-limiting examples of parameter values to be set may comprise:
- a gain value (calibration opportunity in system calibration),
- a sensitivity value,
- a quiescent (output) voltage value,
- an offset value,
- a measurement range value (e.g., 10 mT, 50 mT, 200 mT or 10 A, 50 A, 200 A or pressure ranges or any other sensor parameters),
- a sensor bandwidth value (e.g., 30 kHz or 200 khz sensor bandwidth),
- an over current detection level/threshold (in an over-current detection (OCD) mode),
- a zero current detection level/threshold (in a zero-current detection (ZCD) mode).

The parameter values to be set may be related to the functions to be executed. For example, if the sensor device 110 may execute an over-current detection (OCD) function, then the sensor device 110 may set an OCD-related parameter value, e.g., an OCD threshold. Examples of how the sensor device 110 knows which function to execute and/or which parameter to set, based on the received pulse modulated signal 130, will be described further below.

Figure 2:
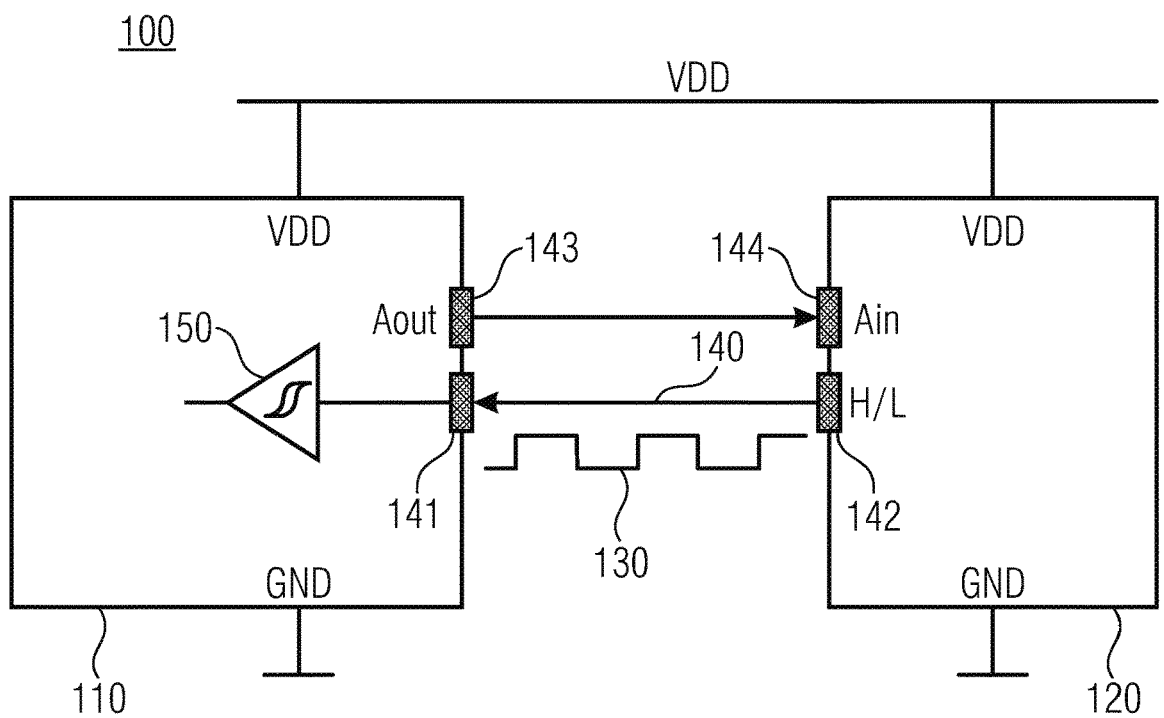
FIG. 2 shows a schematic block diagram of a sensor arrangement according to a further implementation.

Meanwhile, FIG. 2 shows a further implementation of a sensor arrangement 100 with an example unidirectional communication interface 140 according to the herein described innovative concept. In addition to the implementation of FIG. 1, the sensor device 110 may comprise an analog signal output provided at a respective pin 'Aout' labeled with reference numeral 143. The controller device 120 may comprise an analog signal input provided at a respective pin 'Ain' labeled with reference numeral 144.

The sensor device 110 may be connected to a supply voltage at a respective pin 'VDD', and to ground via a respective pin 'GND'. The same holds for the controller device 120 that may also be connected to a supply voltage at a respective pin 'VDD', and to ground via a respective pin 'GND'.

The controller device 120 may be configured to transmit a pulse modulated signal 130, for example a PWM or PCM signal, to the sensor device 110 via the one-wire voltage interface 140, e.g., via one single wire. As mentioned above, the sensor device 110 may comprise one single pin 141 and the controller device 120 may comprise one single pin 142 at which the one-wire voltage interface 140 may be provided. These single pins 141, 142 may be dedicated pins that are dedicated for the one-wire voltage interface 140. Alternatively, existing pins may be used. The use of existing pins may be preferable because it does not alter the hardware layout and no extra space is needed in comparison to providing dedicated pins.

The sensor device 110 may comprise a signal detection unit 150 for detecting the received pulse modulated signal 130. For example, the signal detection unit 150 may comprise a Schmidt trigger. When the sensor device 110 receives the pulse modulated signal 130, the sensor device 110 may re-configure its internal configuration in response to the received pulse modulated signal 130. As mentioned before, the sensor device 110 may execute a predetermined function and/or may set a predetermined parameter in response to the received pulse modulated signal 130. For example, the sensor device 110 may adjust parameters, may set predetermined analog parameters or may execute a predetermined digital function.

It is to be noted that, even though the one-wire voltage interface 140, and in particular the input pin 141 of the sensor device 110, is used to set the parameters, these parameter settings affect the sensor behavior at a different output pin, for example at the analog output pin 143. In other words, parameters which are set via the one-wire voltage interface 140 affect pins different from the one-wire voltage interface 140.

Figure 3:
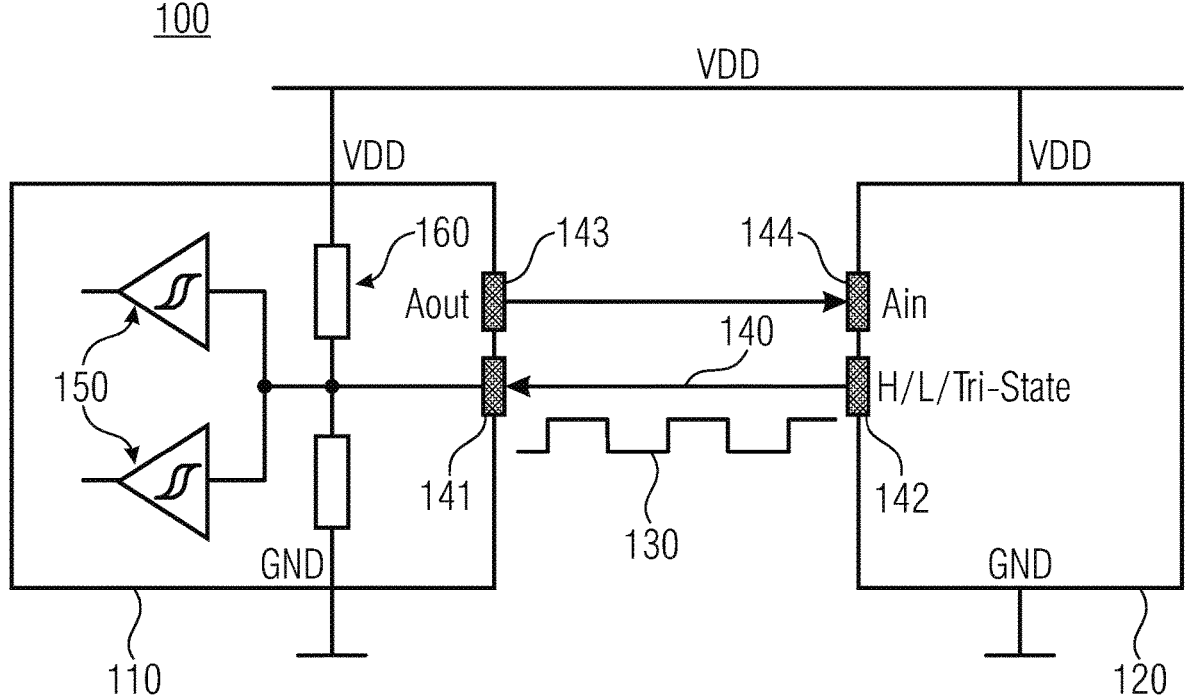
FIG. 3 shows a schematic block diagram of a sensor arrangement according to a further implementation.

FIG. 3 shows a further example implementation of a sensor arrangement 100 according to the present innovative concept. Here, the controller device 120 may comprise a Tri-State driver configured to provide the pulse modulated signal 130 at a high level, a low level and an intermediate level. The signal detection unit 150 of the sensor device 110 may comprise two Schmidt triggers for detecting the respective voltage levels of the pulse modulated signal 130. Furthermore, the sensor device 110 may comprise an internal voltage divider 160. This implementation may use an event-detecting pulse modulated control scheme, wherein a medium voltage level in Tri-State can be used for functional safety or signalizing of "no request for change of settings".

Figure 4:
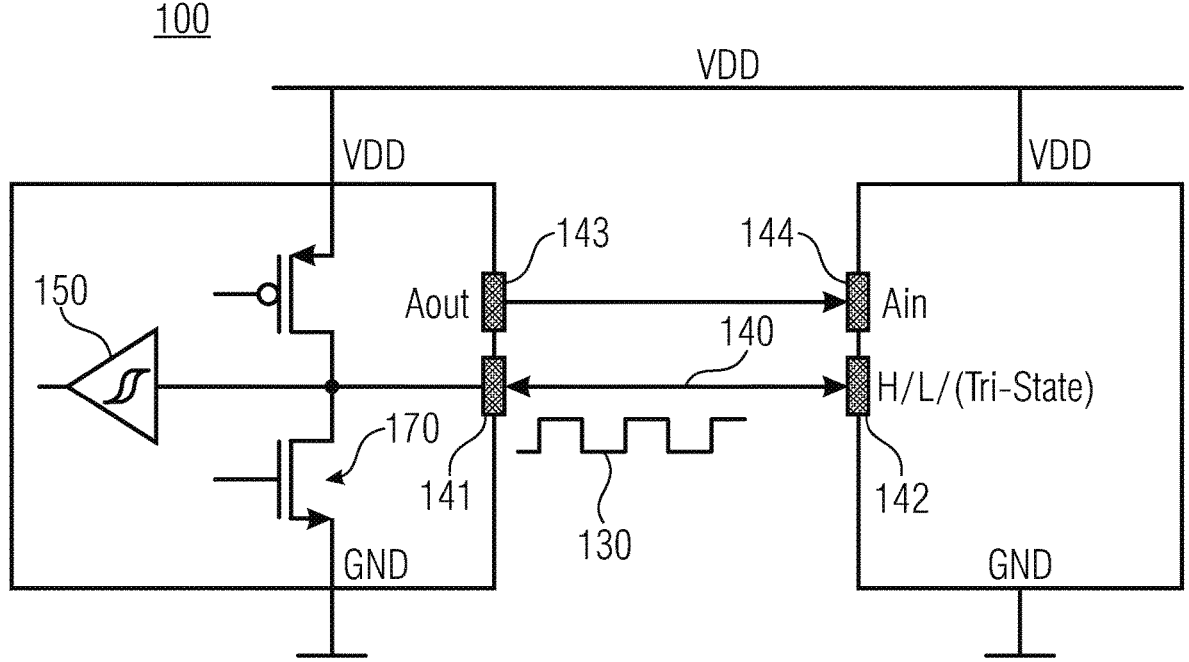
FIG. 4 shows a schematic block diagram of a sensor arrangement according to a further implementation.

FIG. 4 shows a further example implementation of a sensor arrangement 100 according to the present innovative concept. Here, the one-wire voltage interface 140 is configured as a bidirectional interface. Thus, the pulse modulated signal 130 may be transmitted from the control device 120 to the sensor device 110. Thus, as mentioned above, the sensor device 110 may re-configure its internal configuration so as to execute a predetermined function and/or to set a predetermined parameter in response to the received pulse modulated signal 130.

Due to the bidirectional functionality of the one-wire voltage interface 140, a further pulse modulated signal 130 (e.g., a response signal) may optionally be transmitted from the sensor device 110 to the controller device 120. Accordingly, the controller device 120 may change settings of the sensor device 110 using the bidirectional one-wire voltage interface 140, and the sensor device 110 may optionally provide answers to the controller device 120 using the bidirectional one-wire voltage interface 140. For example, the sensor device 110 may answer requests received from the controller device 120, and/or the sensor device 110 may provide sensor status information and/or functional safety information (e.g., failure self-detection) to the controller device 120, and/or the sensor device 110 may provide additional sensor signals (e.g., temperature, stress, under-voltage, etc.) to the controller device 120 via the bidirectional one-wire voltage interface 140.

Accordingly, the sensor device 110 and the controller device 120 may be configured for a bidirectional communication over the one-wire voltage interface 140, wherein the sensor device 110 may be configured to re-configure its internal configuration for sending a response message to the controller device 120 via the one-wire voltage interface 140 in response to the received pulse modulated signal 130. The response message may itself be a further pulse modulated signal 130, as mentioned above. The response message may comprise at least one of sensor status information and/or functional safety information (e.g., failure self-detection) and/or additional sensor signals (e.g., temperature, stress, under-voltage, etc.).

As further mentioned above, the controller device 120 may optionally comprise a Tri-State driver. In this case, the response message may be transmitted at the intermediate voltage level. This may help to distinguish the response signal from the pulse modulated signal 130 that is intended for re-configuring the sensor configuration of the sensor device 110.

In the implementation as depicted in FIG. 4, the sensor device 110 may optionally comprise a push-pull output 170, and the signal detection unit 150 of the sensor device 110 may comprise at least one Schmidt trigger for detecting the received pulse modulated signal 130.

In each and every implementation described herein, the sensor device 110 may alter its internal settings in response to the received pulse modulated signal 130, e.g., the sensor device 110 may re-configure its internal configuration in response to the received pulse modulated signal configuration 130. The sensor device 110 may re-configure its internal configuration for performing a certain action/function and/or for setting a parameter.

In the following, over current detection (OCD) and zero current detection (ZCD) may be described as a non-limiting examples for functions to be executed by the sensor device 110, while OCD levels/thresholds and ZCD levels/thresholds may be described as non-limiting examples for parameters to be set by the sensor device 110.

Accordingly, the sensor device 110 may be configured to perform an electric current detection (e.g., OCD and/or ZCD) as the predetermined function to be executed in response to the pulse modulated signal 130, wherein the sensor device 110 may be configured to set a current threshold value (e.g., OCD threshold and/or ZCD threshold) as the predetermined parameter to be set in response to the pulse modulated signal 130.

Figure 5:
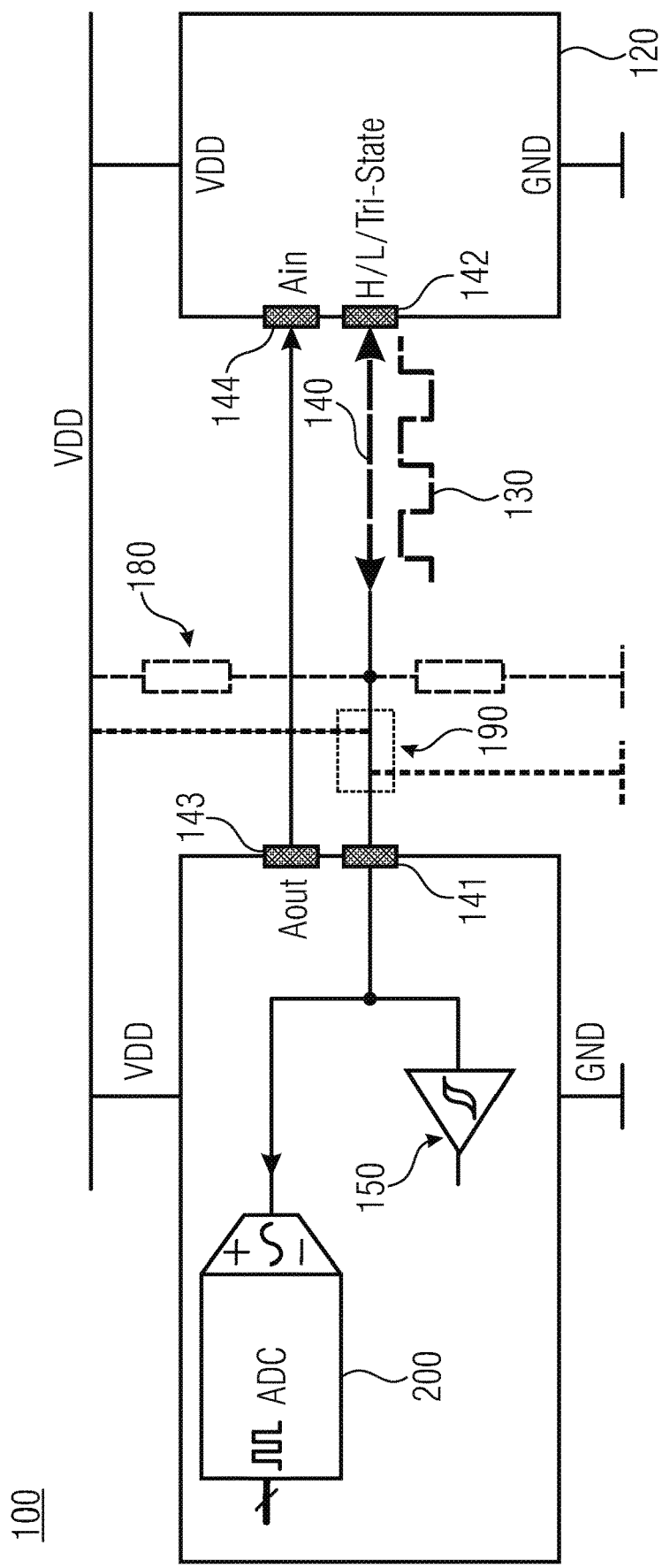
FIG. 5 shows a schematic block diagram of a sensor arrangement according to a further implementation.

FIG. 5 shows an example implementation of a sensor arrangement 100 according to the present innovative concept. Here, the controller device 120 may optionally comprise a Tri-State driver, as described above. A Tri-State driver may optionally be available in every implementation as described herein.

The one-wire voltage interface 140 may be a bidirectional interface. The pulse modulated signal 130 that is transmitted from the controller device 120 to the sensor device 110 may be a voltage signal, and in particular a standard supply voltage signal.

As described in the introductory portion of this disclosure, Over Current Detection (OCD) levels may be set by a voltage divider and/or a hardwired pin-programing. Thus, in addition to the implementations discussed so far, the sensor arrangement 100 of FIG. 5 may optionally comprise a voltage divider 180 and/or a hardwired pin-configuration 190.

However, as discussed above, in case of pin-programming 190 only a limited number of settings are available, depending on the number of pins. Furthermore, the more pins are spent for the pin-programing, the less pins are available for other useful functions. In case of the voltage divider 180, expensive high precision hardware (e.g., resistors) is needed.

With the present innovative concept, all of these drawbacks can be minimized or even compensated. The pulse modulated signal 130 takes over the tasks of the hardwired pin-configuration 190 and/or of the voltage divider 180. In response to the pulse modulated signal 130, the sensor device 110 is prompted to execute a certain function and/or to set a certain parameter, for example an OCD level.

In this regard, the sensor device 110 may optionally comprise an analog level detection unit 200 for detecting the analog OCD levels as provided by the voltage divider 180 and/or the hardwired pin-configuration 190. The analog level detection unit 200 may comprise an Analog-to-Digital converter (ADC). Thus, the analog level detection unit 200 may be configured to detect analog values, as provided by the pin configuration 190 and/or the voltage divider 180, and/or to detect digital signal protocols, as provided using the binary pulse modulated signal 130.

Additionally or alternatively, the sensor device 110 may comprise a signal detection unit 150 for detecting the binary pulse modulated signal 130 transmitted via the one-wire voltage interface 140. The signal detection unit 150 may comprise a Schmidt trigger.

The signal detection unit 150, or the analog level detection unit 200, may comprise a frequency detector for determining a frequency of the pulse modulated signal 130 and/or a duty cycle detector for determining a duty cycle of the pulse modulated signal 130. Thus, the signal detection unit 150, or the analog level detection unit 200, may be configured to detect a duty cycle and/or a frequency of the received pulse modulated signal 130. For example, the signal detection unit 150, or the analog level detection unit 200, may comprise two counters, one for the duty cycle and another one for the frequency of the pulse modulated signal 130.

For example, if a first duty cycle is detected, then the sensor device 110 may re-configure its internal configuration to execute a first function and/or to set a first parameter. If a different second duty cycle is detected, then the sensor device 110 may re-configure its internal configuration to execute a different second function and/or to set a different second parameter. Stated in more general terms, in response to the detected duty cycle of the received pulse modulated signal 130, the sensor device 110 may execute a predetermined function and/or set a predetermined parameter.

The same holds for a detected frequency, e.g., in response to the detected frequency of the received pulse modulated signal 130, the sensor device 110 may execute a predetermined function and/or set a predetermined parameter.

Thus, the sensor device 110 (in particular the signal detection unit 150 or the analog level detection unit 200) may be configured to determine at least one of a first signal characteristic and a second signal characteristic of the received pulse modulated signal 130. For example, the first signal characteristic may be a frequency of the received pulse modulated signal 130. The second signal characteristic may be a duty cycle of the received pulse modulated signal 130.

For example, the first signal characteristic of the pulse modulated signal 130 may be a signal frequency, wherein different signal frequencies of the pulse modulated signal 130 may be related with different functions to be executed by the sensor device 110, wherein the sensor device 110 may be configured to execute the one predetermined function that is related with the determined signal frequency. For example, a first signal frequency may be related with Over Current Detection (OCD) function, and a second signal frequency may be related with a Zero Current Detection (ZCD) function. In this case, the sensor device 110 may execute the OCD function in response to the received pulse modulated signal 130 having the first frequency, while the sensor device 110 may execute the ZCD function in response to the received pulse modulated signal 130 having the second frequency. In other words, two different frequencies of the pulse modulated signal 130 may be used to change the OCD and ZCD threshold in the sensor device 110.

For example, the second signal characteristic of the pulse modulated signal 130 may be a duty cycle, wherein different duty cycles of the pulse modulated signal 130 may be related with different parameter values to be set by the sensor device 110, wherein the sensor device 110 may be configured to set the one predetermined parameter value that is related with the determined duty cycle. For example, a first duty cycle may be related with a first Over Current Detection (OCD) level (e.g., 30 mA), and a second duty cycle may be related with a different second Over Current Detection (OCD) level (e.g., 50 mA). In this case, the sensor device 110 may set the first OCD level in response to the received pulse modulated signal 130 having the first duty cycle, while the sensor device 110 may set the second OCD level in response to the received pulse modulated signal 130 having the second duty cycle.

Summarizing, the sensor device 110 may execute a predetermined function and/or may set a predetermined parameter value based on the determined signal characteristic of the received pulse modulated signal 130.

The above discussed duty cycle and frequency are merely mentioned as non-limiting examples for signal characteristics. Other signal characteristics may be possible, for instance, a first signal characteristic may be an even order pulse modulated signal 130, while a second signal characteristic may be an odd order pulse modulated signal 130. For example, the sensor device 110 may re-configure its internal configuration to a first configuration state in response to an even order pulse modulated signal 130. In turn, the sensor device 110 may re-configure its internal configuration to a different second configuration state in response to an odd order pulse modulated signal 130. For example, the sensor device 110 may execute a function and/or set a parameter value in response to an even order pulse modulated signal 130. In turn, the sensor device 110 may stop executing a function and/or may reset a parameter value in response to an odd order pulse modulated signal 130.

Additionally or alternatively, one particular predetermined value of the pulse modulated signal 130 may be used for resetting the sensor device 110. That is, the sensor device 110 may be configured to perform a reset in response to a pulse modulated signal 130 having one particular predetermined value.

The sensor device 110 may comprise an internal mapping for mapping the signal characteristic (e.g., duty cycle or frequency) of the received pulse modulated signal 130 to a certain function or parameter value, wherein different signal characteristics (e.g., duty cycles or frequencies) are mapped to different parameter values or functions. For example, the internal mapping function may be used to identify the OCD level belonging to the duty cycle of the received pulse modulated signal 130. The internal mapping may be stored in an internal storage of the sensor device 110, for instance an EEPROM.

Additionally or alternatively, a first signal portion (e.g., the first 50% of a received pulse modulated signal 130) may be used to prompt the sensor device 110 to execute a certain function, while a second signal portion (e.g., the second 50% of the received pulse modulated signal 130) may be used to prompt the sensor device 110 to set a predetermined parameter value. Further additionally or alternatively, a first signal portion may be used to set a digital setting, while a second signal portion may be used to set an analog value (e.g., calibration values or gain or OCD-levels, etc.).

That is, the sensor device 110 may be configured to re-configure its internal configuration for executing the predetermined function in response to the determined first signal portion. Additionally or alternatively, the sensor device 110 may be configured to re-configure its internal configuration for setting the predetermined parameter value in response to the determined second signal portion.

As exemplarily shown in FIG. 5, and as mentioned above, the sensor arrangement 100 may optionally comprise a voltage divider 180 and/or a hardwired pin-configuration 190 for setting the current thresholds (e.g., OCD level and/or ZCD level).

As mentioned above, the signal detection unit 150, or the analog level detection unit 200, may comprise a frequency detector for determining a frequency of the pulse modulated signal 130, and/or a duty cycle detector for determining a duty cycle of the pulse modulated signal 130. For example, based on the detected signal frequency, the sensor device 110 may decide to receive OCD and/or ZCD thresholds from the controller device 120 or to send the selected information from the sensor device 110 to the controller device 120, e.g., like sending information about ISM failures, distinguishing the OCD triggering due to the overcurrent or safety issue, temperature, etc. For example, a certain signal frequency (e.g., 4 kHz) may be used to tell the sensor device 110 to switch from receiving mode to sending mode, or vice versa.

As a further example, based on the frequency detector output, the detection unit 150 or the analog level detection unit 200 may recognize whether the received signal derives from the resistor divider 180 (or from the pin-configuration 190) or whether it is the pulse modulated signal 130. If the pulse modulated signal 130 is detected, a Digital-to-Analog converter (DAC) may be provided for determining the signal characteristics, as discussed above, for example for detecting OCD and/or ZCD thresholds.

If only the resistor divider 180 (or pin-configuration 190) is used, then an internal Analog-to-Digital converter (ADC) may be provided for detecting the voltage. In this case only either one of OCD or ZCD thresholds may be varied, but not both of them. For example, for the first ten variants the OCD threshold may be varied.

As exemplarily shown in FIG. 5, in case the voltage divider 180 and/or the hardwired pin-configuration 190 are present, the one-wire voltage interface 140 may be provided at the same pins 141, 142 at which the voltage divider 180 and/or the hardwired pin-configuration 190 is connected. Thus, existing pins can be used for the present innovative concept, which is highly advantageous since no additional dedicated pins have to be provided.

Otherwise, only one additional single pin has to be provided at the sensor device 110 and at the controller device 120, respectively, for providing the (bidirectional) one-wire voltage interface 140 for re-configuring the sensor device 110 based on the received pulse modulated signal 130. Thus, for programming the overcurrent detection (OCD) levels according to the herein described innovative concept, as discussed above, only one pin or even no additional pins have to be provided.

Even if the one-wire voltage interface 140 is connected at the same pin (e.g., at pin 141) as the voltage divider 180 and/or the pin-configuration 190, the sensor device 110 may be configured to let the pulse modulated signal 130 override any analog signal of the hardwired pin configuration 190 and/or of the voltage divider 180, respectively, such that the pulse modulated signal 130 is prioritized.

The present innovative concept allows to re-configure the internal configuration of the sensor device 110 during normal operation, e.g., on-the-fly, without affecting the normal operation of the sensor device 110. This is not possible with pin-programming 190 or with the voltage divider 180.

The pulse modulated signal can be sent any time after start up or with some particular interval from the controller device 120 (e.g., for functional safety). If the disclosed innovative concept may be available but not activated in a sensor arrangement, then the sensor pin 141 may be connected either to GND or to VDD to avoid a floating node. Furthermore, when the controller device 120 is configured in the Tri-State in order to receive information from the sensor device 110, then the resistor divider 180 and/or pin-configuration 190 may be omitted. Further, if both the sensor device 110 and the controller device 120 may be configured in Tri-State, then the pin 141 may be connected to either VDD or GND to avoid a floating node.

The herein disclosed innovative concept is compatible with existing pin-programming 190 or external voltage divider level programming 180. Sensor parameters and/or functions may be changed based on a duty cycle mapping, e.g., no complicated protocol programming interface is needed. The resistors of the voltage divider 180 can be eliminated in unidirectional mode, and End-of-Line (EOL) calibration and production time can be saved with the herein disclosed innovative method.

Figure 6:
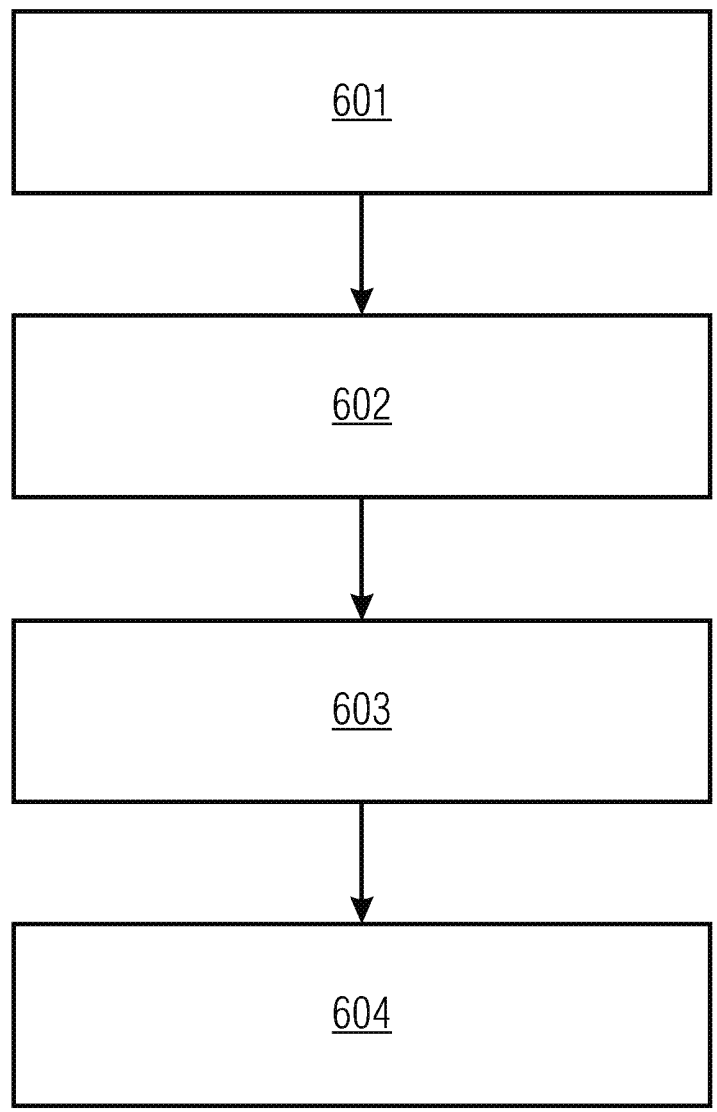
FIG. 6 shows a schematic block diagram of a method according to an implementation.

The herein disclosed innovative concept further concerns a method for configuring a sensor device 110 using a pulse modulated signal 130, as discussed above. FIG. 6 shows a schematic block diagram of a method according to an implementation.

In block 601 a sensor device 110 and a controller device 120 are provided, both configured to communicate with each other.

In block 602, a pulse modulated signal 130 is transmitted from the controller device 120 to the sensor device 110 via a one-wire voltage interface 140.

In block 603, the pulse modulated signal 130 is received by the sensor device 110 via the one-wire voltage interface 140.

In block 604, the sensor device 110 re-configures its internal sensor configuration in response to the received pulse modulated signal 130.

The herein described innovative concept may provide, among others, at least the following advantages:
  Provides a very easy customer programming function, particularly for sensors with analog output with only one additional pin (line connection to µP) for analog parameter programming or system calibration
  A set of different digital functions (255 settings with 8 bit PWM, 2047 settings with 12 bit-PWM) is possible (much, much more than pin programming solutions)
  Low-cost solutions for systems regarding sensor, PCB and microcontroller
  only one single line (e.g., implementable in software of a microprocessor)
  The herein described innovative concept may be implemented in:
  Current sensors with analog output
  Linear sensors with analog output
  Low-cost sensors without EEPROM or OTP-infrastructure
  TMR linear sensors
  Low-power sensors
  Turn-counters
  vHall angle sensors Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, like for example, a microprocessor, a programmable computer or an electronic circuit. In some implementations, one or more of the most important method steps may be executed by such an apparatus.

Depending on certain implementation requirements, implementations can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some implementations comprise a data carrier having electronically readable control signals, which are capable of cooperating with a programmable computer system, such that one of the methods described herein is performed.

Generally, implementations can be implemented as a computer program product with a program code, the program code being operative for performing one of the methods when the computer program product runs on a computer. The program code may for example be stored on a machine readable carrier.

Other implementations comprise the computer program for performing one of the methods described herein, stored on a machine readable carrier.

In other words, an implementation of the inventive method is, therefore, a computer program having a program code for performing one of the methods described herein, when the computer program runs on a computer.

A further implementation of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further implementation of the inventive method is, therefore, a data stream or a sequence of signals representing the computer program for performing one of the methods described herein. The data stream or the sequence of signals may for example be configured to be transferred via a data communication connection, for example via the Internet.

A further implementation comprises a processing means, for example a computer, or a programmable logic device, configured to or adapted to perform one of the methods described herein.

A further implementation comprises a computer having installed thereon the computer program for performing one of the methods described herein.

A further implementation comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some implementations, a programmable logic device (for example a field programmable gate array) may be used to perform some or all of the functionalities of the methods described herein. In some implementations, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this disclosure has been described with reference to illustrative implementations, this description is not intended to be construed in a limiting sense. Various modifications and combinations of the illustrative implementations, as well as other implementations of this disclosure, will be apparent to persons skilled in the art upon reference to the description. It is therefore intended that the appended claims encompass any such modifications or implementations.

The invention claimed is:

1. A re-configurable sensor arrangement, comprising:
a sensor; and
a controller wherein the sensor and the controller are configured to communicate with each other,
wherein the controller is configured to transmit a pulse modulated signal to the sensor via a one-wire voltage interface, and
wherein the sensor is configured to receive the pulse modulated signal via the one-wire voltage interface and to re-configure an internal configuration of the sensor in response to the pulse modulated signal.

2. The re-configurable sensor arrangement according to claim 1, wherein the one-wire voltage interface is a bidirectional interface for transmitting and receiving one or more pulse modulated signals via one wire of the wire voltage interface.

3. The re-configurable sensor arrangement according to claim 1, wherein the pulse modulated signal transmitted via the one-wire voltage interface is a supply voltage signal.

4. The re-configurable sensor arrangement according to claim 1, wherein the pulse modulated signal is a Pulse Width Modulated (PWM) signal or a Pulse Code Modulated (PCM) signal.

5. The re-configurable sensor arrangement according to claim 1, wherein the sensor is configured to re-configure the internal configuration for at least one of executing a predetermined function in response to the pulse modulated signal or setting a predetermined parameter in response to the pulse modulated signal.

6. The re-configurable sensor arrangement according to claim 5, wherein the predetermined parameter to be set comprises at least one of a gain, a sensitivity, a quiescent voltage, a measurement range, a sensor bandwidth, an over current detection level, or a zero current detection level, and
wherein the predetermined function to be executed comprises at least one of setting an output polarity, setting an output quiescent voltage ratio, setting a duty cycle for low-power operation, performing a test mode, providing, on request of the controller, a result of an internal measurement, or providing, on request of the controller, a functional safety status signal.

7. The re-configurable sensor arrangement according to claim 5, wherein the sensor is configured to:
determine a first signal characteristic of the pulse modulated signal, and
re-configure the internal configuration for executing the predetermined function in response to determining the first signal characteristic.

8. The re-configurable sensor arrangement according to claim 7, wherein the first signal characteristic of the pulse modulated signal is a signal frequency,
wherein different signal frequencies of the pulse modulated signal are related to different functions to be executed by the sensor, and
wherein the sensor is configured to execute one of the different functions that is related to the signal frequency as the predetermined function.

9. The re-configurable sensor arrangement according to claim 7, wherein the sensor is configured to:
determine a second signal characteristic of the pulse modulated signal, and
re-configure the internal configuration for setting the predetermined parameter in response to determining the second signal characteristic.

10. The re-configurable sensor arrangement according to claim 9, wherein the second signal characteristic of the pulse modulated signal is a duty cycle, wherein different duty cycles of the pulse modulated signal are related to different parameter values to be set by the sensor,
wherein the sensor is configured to set one of the different parameter values that is related to the duty cycle as a value for the predetermined parameter.

11. The re-configurable sensor arrangement according to claim 10, wherein the sensor comprises an internal mapping for mapping the duty cycle of the pulse modulated signal to a certain parameter value of the different parameter values, wherein each different duty cycle is mapped to a different parameter value of the different parameter values.

12. The re-configurable sensor arrangement according to claim 5, wherein the sensor is configured to:
determine a first signal portion and a second signal portion of the pulse modulated signal,
re-configure the internal configuration for executing the predetermined function in response to determining the first signal portion, and
re-configure the internal configuration for setting the predetermined parameter in response to determining the second signal portion.

13. The re-configurable sensor arrangement according to claim 5, wherein the sensor is configured to perform an electric current detection as the predetermined function to be executed in response to the pulse modulated signal, and
wherein the sensor is configured to set a current threshold value as the predetermined parameter to be set in response to the pulse modulated signal.

14. The re-configurable sensor arrangement according to claim 13, further comprising at least one of a hardwired pin configuration for setting the current threshold value or a voltage divider for setting the current threshold value,
wherein the sensor is configured to allow the pulse modulated signal to override an analog signal of the hardwired pin configuration such that the pulse modulated signal is prioritized over the analog signal of the hardwired pin configuration or allow the pulse modulated signal to override an analog signal of the voltage divider such that the pulse modulated signal is prioritized over the analog signal of the voltage divider.

15. The re-configurable sensor arrangement according to claim 14, wherein the sensor comprises a plurality of input/output pins, and
wherein the pulse modulated signal and the analog signal of the hardwired pin configuration or the analog signal of the voltage divider, respectively, are provided at one input pin.

16. The re-configurable sensor arrangement according to claim 1, wherein the sensor and the controller are configured for a bidirectional communication over the one-wire voltage interface, wherein the sensor is configured to re-configure the internal configuration for sending a response message to the controller via the one-wire voltage interface in response to the pulse modulated signal.

17. The re-configurable sensor arrangement according to claim 16, wherein the response message comprises sensor status information.

18. The re-configurable sensor arrangement according to claim 16, wherein the sensor comprises a tri-state driver configured to provide the pulse modulated signal at a high level and a low level, and wherein the response message is transmitted at an intermediate level set between the high level and the low level.

19. A method for configuring a sensor device using a pulse modulated signal, the method comprising:
   providing a sensor and a controller, wherein the sensor and the controller are configured to communicate with each other;
   transmitting a pulse modulated signal from the controller to the sensor via a one-wire voltage interface;
   receiving, by the sensor, the pulse modulated signal via the one-wire voltage interface; and
   re-configuring, by the sensor, the sensor in response to receiving the pulse modulated signal.

20. A non-transitory computer readable digital storage medium having stored thereon a computer program having a program code for performing, when running on a computer, a method comprising the steps of:
   providing a sensor and a controller, wherein the sensor and the controller are configured to communicate with each other;
   transmitting a pulse modulated signal from the controller to the sensor via a one-wire voltage interface;
   receiving, by the sensor, the pulse modulated signal via the one-wire voltage interface; and
   re-configuring, by the sensor, the sensor in response to receiving the pulse modulated signal.

* * * * *